(12) United States Patent
Frank et al.

(10) Patent No.: US 11,994,478 B2
(45) Date of Patent: May 28, 2024

(54) SENSOR WITH A CLEANING DEVICE

(71) Applicant: Endress+Hauser Conducta GmbH+Co. KG, Gerlingen (DE)

(72) Inventors: Rüdiger Frank, Haigerloch (DE); Jörg Mohring, Tübingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 110 days.

(21) Appl. No.: 17/231,420

(22) Filed: Apr. 15, 2021

(65) Prior Publication Data
US 2021/0325316 A1 Oct. 21, 2021

(30) Foreign Application Priority Data

Apr. 16, 2020 (DE) ...................... 10 2020 110 430.8

(51) Int. Cl.
*G01N 21/94* (2006.01)
*B08B 1/12* (2024.01)
(Continued)

(52) U.S. Cl.
CPC ............... *G01N 21/94* (2013.01); *B08B 1/12* (2024.01); *B08B 1/165* (2024.01); *B08B 1/30* (2024.01);
(Continued)

(58) Field of Classification Search
CPC ......... B08B 1/002; B08B 1/005; B08B 1/008; B08B 1/04; B08B 1/006; B08B 1/00;
(Continued)

(56) References Cited

U.S. PATENT DOCUMENTS 2,712,148 A * 7/1955 Cheshire ................... B60S 1/06
15/250.22
4,611,364 A * 9/1986 Grubner ............... B60S 1/3801
15/250.41
(Continued)

FOREIGN PATENT DOCUMENTS

AU 648513 B2 * 4/1994
CN 1550198 A 12/2004
(Continued)

OTHER PUBLICATIONS

FR_2691933_Translated_Description (Year: 1993).*

*Primary Examiner* — David S Posigian
*Assistant Examiner* — Jacob Adam Montgomery
(74) *Attorney, Agent, or Firm* — Christopher R. Powers; Endress+Hauser (USA) Holding, Inc.

(57) ABSTRACT

A sensor of the present disclosure includes a sensor housing with a housing window; a sensor unit arranged in the sensor housing suitable for emitting a sensor signal through the housing window and for receiving a detection signal through the housing window (3); a cleaning unit having a cleaning element, a holder and a drive, wherein the cleaning element is attached to the holder such that the cleaning element is suitable for contacting the housing window from the outside, wherein the drive is non-positively connected to the holder and is suitable for moving the cleaning element across the housing window; and a pressing unit which is suitable for exerting an adjustable contact pressure on the cleaning unit so that the cleaning element is pressed against the housing window with the contact pressure.

7 Claims, 2 Drawing Sheets

(51) Int. Cl.
    *B08B 1/16*         (2024.01)
    *B08B 1/30*         (2024.01)
    *B08B 1/32*         (2024.01)
    *B08B 13/00*       (2006.01)
    *G01N 21/15*       (2006.01)

(52) U.S. Cl.
    CPC ............... *B08B 1/32* (2024.01); *B08B 13/00* (2013.01); *G01N 21/15* (2013.01); *G01N 2021/152* (2013.01); *G01N 2021/157* (2013.01); *G01N 2201/022* (2013.01)

(58) Field of Classification Search
    CPC ........ B08B 13/00; G01N 21/94; G01N 21/15; G01N 2021/152; G01N 2021/157; G01N 2021/022; G01D 5/26; G01D 5/48; G01D 11/245; G02B 27/0006; B60S 2001/3834; B60S 1/56
    USPC ........................................................ 15/250.01
    See application file for complete search history.

(56) References Cited

U.S. PATENT DOCUMENTS

| | | | | |
|---|---|---|---|---|
| 5,323,508 | A * | 6/1994 | Sheldrake | B08B 1/008 |
| | | | | 15/250.04 |
| 6,458,213 | B1 * | 10/2002 | Krieg | G01N 21/15 |
| | | | | 356/239.8 |
| 7,313,840 | B2 * | 1/2008 | Watkins | F04D 13/027 |
| | | | | 15/103 |
| 9,632,019 | B2 * | 4/2017 | Karagöz | G01N 21/15 |
| 2004/0018104 | A1 | 1/2004 | Watkins | |
| 2009/0301175 | A1 * | 12/2009 | Battefeld | G01N 33/1886 |
| | | | | 73/53.01 |
| 2010/0089417 | A1 * | 4/2010 | Nelson | B60S 1/3801 |
| | | | | 15/250.04 |
| 2019/0146213 | A1 * | 5/2019 | Slama | H04N 23/51 |
| | | | | 359/511 |
| 2019/0361227 | A1 * | 11/2019 | Jo | B60S 1/566 |
| 2020/0159010 | A1 * | 5/2020 | Kuwae | G01S 7/4813 |
| 2020/0307525 | A1 * | 10/2020 | Sparbert | B60S 1/52 |

FOREIGN PATENT DOCUMENTS

| | | | |
|---|---|---|---|
| DE | 10018621 A | 10/2001 | |
| FR | 2691933 A1 * | 12/1993 | ............ B60S 1/3415 |
| JP | 2004230315 A | 8/2004 | |
| WO | WO-2020218799 A1 * | 10/2020 | |

\* cited by examiner

SENSOR WITH A CLEANING DEVICE

CROSS-REFERENCE TO RELATED APPLICATION

The present application is related to and claims the priority benefit of German Patent Application No. 10 2020 110 430.8, filed on Apr. 16, 2020, the entire contents of which are incorporated herein by reference.

TECHNICAL FIELD

The present disclosure relates to a sensor with a cleaning device.

BACKGROUND

In analytical measurement technology, especially in the field of water management, measurement variables such as, for example, the turbidity of a measured medium or the separation and transition zones in the measured medium are of particular importance. These measured variables can be detected and monitored, for example, by means of optical sensors or ultrasonic sensors.

Continuous and precise detection of measured values by these sensors is of primary importance in process measurement technology in order to control and regulate processes with the highest precision. At the same time, the maintenance effort for these sensors should be as low as possible for the installation operator. In many applications, however, the sensors are subject to harsh environmental conditions and are exposed to high potential soiling which increases the maintenance effort for the sensors.

In the case of optical sensors, precise detection of measured values can only be guaranteed if the transparent windows of the optical sensor and thus the light paths into the measured medium are clean and free of soiling. In the case of ultrasonic sensors, soiling also has a negative effect on the detection of measured values.

In order to free the windows of the optical sensor, or the sensor surface of an ultrasonic sensor, from dirt, the following different cleaning methods exist:
- mechanical cleaning by means of a window wiper;
- compressed air or liquid cleaning, in which either air or cleaning liquids are applied to the window of the sensor;
- ultrasonic cleaning in which the formation of build-up on the window of the sensor is reduced by mechanical vibration;
- mechanical cleaning of the window by means of handheld cleaning brushes.

However, depending on the type of soiling, for example, organic soiling such as fats or inorganic soiling such as slurry deposits, the known cleaning methods have the following disadvantages:
- cleaning the sensor with a wiper may, for example, in some circumstances smear contaminants deposited on the window of the sensor across the window surface to be cleaned. Thus, the light paths into the measured medium are even impaired by the supposed cleaning;
- cleaning with compressed air or cleaning liquids may, for example, in some circumstances not satisfactorily prevent deposition of a dirt film. This applies equally to cleaning by ultrasound;
- a handheld cleaning brush requires a significant amount of effort. In addition, if particles are present on the window surface of the sensor and intensive brush cleaning is carried out by hand, these particles can develop an abrasive effect and thus damage the window surface. Such damage also leads to impairment of the light paths into the sensor.

SUMMARY

It is therefore an object of the present disclosure to propose a sensor with a cleaning unit which makes it possible to achieve optimum measurement results with minimal effort.

This object is achieved by a sensor according to the present disclosure.

The sensor according to the present disclosure comprises:
- a sensor housing having a housing window,
- a sensor unit which is arranged in the sensor housing and is suitable for emitting a sensor signal through the housing window and receiving a detection signal through the housing window,
- a cleaning unit having a cleaning element, a holder and a drive, wherein the cleaning element is attached to the holder in such a way that the cleaning element is suitable for contacting the housing window from the outside, wherein the drive is non-positively connected to the holder and is suitable for moving the cleaning element across the housing window,
- a pressing unit that is suitable for exerting an adjustable contact pressure on the cleaning unit so that the cleaning element is pressed with the contact pressure against the housing window.

The cleaning unit according to the present disclosure of the sensor makes it possible for the sensor to be optimally cleaned even if it is exposed to a high level of soiling. Depending on the soiling of the optical sensor, the cleaning unit makes it possible especially to minimize the risk of abrasive cleaning and at the same time minimize the cleaning time. Cleaning with the cleaning unit is thus especially efficient. A further advantage is that the sensor is cleaned in the best possible manner and undergoes cleaning by the cleaning unit which is as gentle on the material as possible.

According to one embodiment of the present disclosure, the sensor also has a dirt detection unit which is suitable for detecting soiling of the housing window. The dirt detection unit is connected to the pressing unit and is suitable for controlling the contact pressure depending on the detected soiling of the housing window.

According to one embodiment of the present disclosure, the pressing unit comprises a magnetic module with a magnetic field generator and a magnetic counterpart. The magnetic field generator is suitable for generating an adjustable magnetic field, and the magnetic counterpart is connected to the cleaning unit such that the contact pressure of the cleaning element can be adjusted by the adjustable magnetic field.

According to one embodiment of the present disclosure, the magnetic counterpart is connected to the holder or is part of the holder, and the magnetic field generator is designed such that the adjustable magnetic field moves the holder such that the contact pressure acts on the cleaning element.

According to one embodiment of the present disclosure, the cleaning element is a circular brush and is suitable to be rotationally driven by the holder.

According to one embodiment of the present disclosure, the cleaning element is a wiper.

BRIEF DESCRIPTION OF THE DRAWINGS

The present disclosure will be explained in more detail on the basis of the following description of the figures. The following are shown.

DETAILED DESCRIPTION

Figure 1:
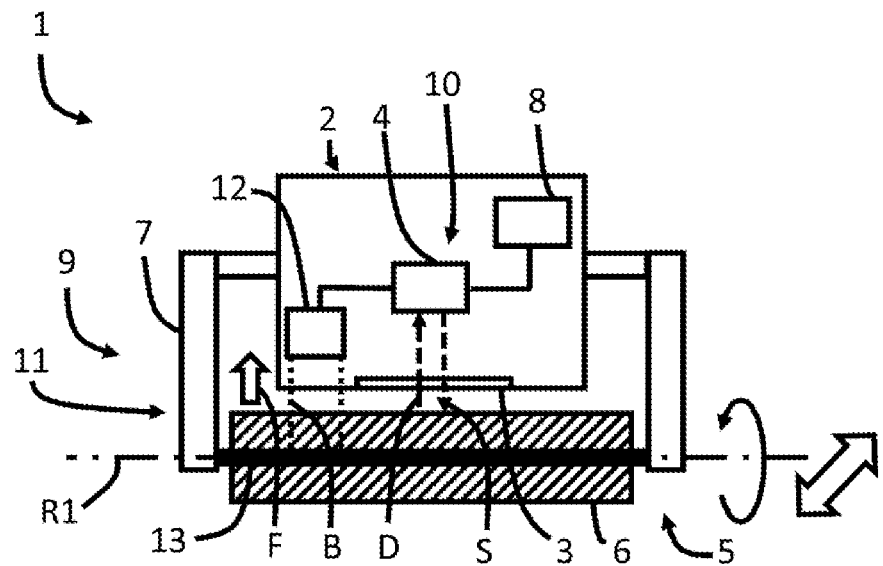
FIG. 1 shows a schematic representation of a sensor according to the present disclosure with a cleaning device.

FIG. 1 shows a sensor 1 according to the present disclosure having a sensor housing 2, a sensor unit 4, a cleaning unit 5, and a pressing unit 9. The sensor 1 is, for example, an optical sensor or an ultrasonic sensor.

The sensor housing 2 has a housing window 3. The housing window 3 is designed such that it is transparent to radiation or sound waves of specific wavelengths. If the sensor 1 is an optical sensor, the housing window 3 is made, for example, of glass, or sapphire glass, or another optically transparent material. If the sensor 1 is an ultrasonic sensor, the housing window 3 is made, for example, of an epoxy resin, or another plastic, or another ultrasound-transmissive material.

The sensor unit 4 is arranged in the sensor housing 2 and is suitable for emitting a sensor signal S through the housing window 3. The sensor unit 4 is also suitable for receiving a detection signal D through the housing window 3. The sensor signal S is a sound signal in the frequency range of 100 kHz-1300 kHz if the sensor 1 is an ultrasonic sensor. The sensor signal S is an electromagnetic signal in the wavelength range of 190 nm-10,000 nm if the sensor 1 is an optical sensor. In the case of an optical sensor, the sensor unit 4 comprises a light source and a light detector (not shown). In the case of an ultrasonic sensor, the sensor unit 4 comprises a piezoelectric element suitable for emitting and receiving ultrasonic waves (not shown).

The cleaning unit 5 comprises a cleaning element 6, a holder 7 and a drive 8. The cleaning element 6 is attached to the holder 7. The drive 8 is connected non-positively to the holder 7. The drive 8 is arranged in the sensor housing 2. The drive 8 is, for example, an electric motor. The drive 8 and the holder 7 are suitable for moving the cleaning element 6 across the housing window 3 (see diagonal double-arrow in FIG. 1). More specifically, the drive 8 and the holder 7 enable the cleaning element 6 to move between a first position and a second position. The first position and the second position are arranged in a first plane parallel to the housing window 3. Also, the drive 8 and the holder 7 enable the cleaning element 6 to move between the first position and a third position (see arrow F in FIG. 1). The first position and the third position are arranged in a to the second plane, which is different from the first plane. The second plane is, for example, perpendicular to the first plane. In other words, the holder 7 enables at least a movement of the cleaning element 6 in three dimensions.

The cleaning element 6 is, for example, a wiper or a brush, preferably a round brush. As a result of the rotation, the cleaning brush per se has a cleaning effect that is greater than wiper cleaning. The bristles of the cleaning brush are preferably made of plastic. The cleaning brush is rotated about a first axis of rotation R1, as shown in FIG. 1 and FIG. 2 by the annular arrows.

The cleaning element 6 is attached to the holder 7 such that the cleaning element 6 is suitable for contacting the housing window 3 from the outside. In the embodiments of the sensor 1 shown in FIGS. 1 and 2, the cleaning element 6 is a brush. In the embodiment shown in FIG. 3, the cleaning element 6 is a wiper.

Figure 2:
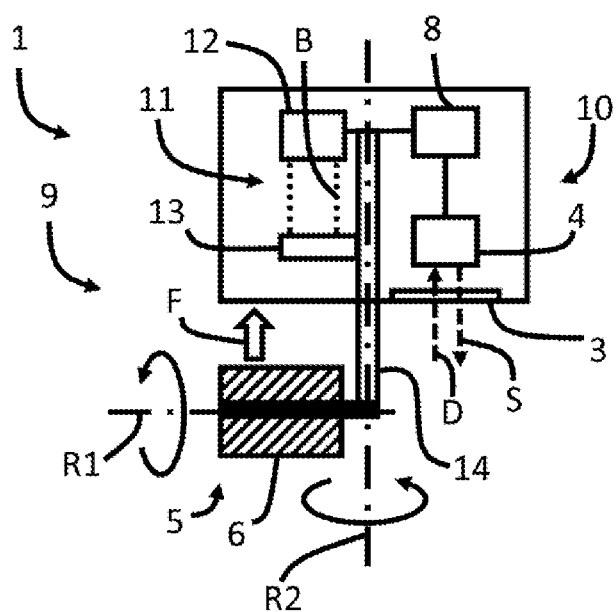
FIG. 2 shows an alternative embodiment of the sensor from FIG. 1 with an alternative cleaning device.
Figure 3:
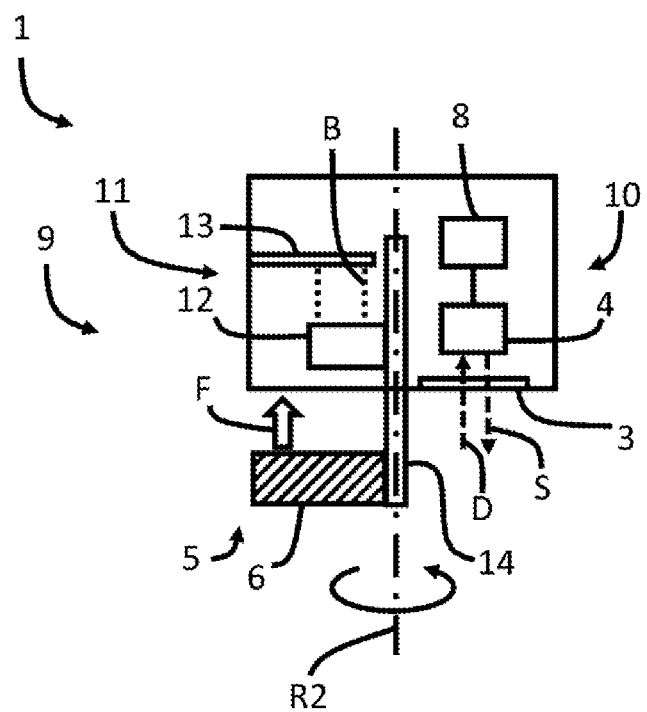
FIG. 3 shows an alternative embodiment of the sensor from FIG. 1 with an alternative cleaning device.

The pressing unit 9 is suitable for exerting an adjustable contact pressure F on the cleaning unit 5 so that the cleaning element 6 is pressed with the contact pressure F onto the housing window 3 (see arrow F in FIGS. 1-3).

The contact pressure F is generated, for example, using a magnetic module 11. The magnetic module 11 has a magnetic field generator 12 and a magnetic counterpart 13. The magnetic field generator 12 is, for example, an electric coil. The current flowing through the electric coil generates a magnetic field B which depends on the electric current. The magnetic counterpart 13 is, for example, a shaft to which the brush is attached (see FIG. 1).

In FIG. 1, the magnetic counterpart 13 is connected to the holder 7 or is part of the holder 7. In this case, the magnetic field generator 12 is designed such that the adjustable magnetic field B moves the holder 7 in such a way that the contact pressure F acts on the cleaning element 6.

If the cleaning element 6 is a round brush, it is rotatably driven by the holder 7. For this purpose, the holder 7 has, for example, a hinged connection for force transmission.

In order to adjust the contact pressure F by the pressing unit 9, the pressing unit 9 monitors, for example, the current consumption of the drive 8. On contact with the sensor surface, a contact pressure F arises which is exerted on the housing window 3 by the cleaning unit 5. This contact pressure F can be detected indirectly via an increased current consumption of the drive 8. By limiting or selectively adjusting the current consumption of the drive 8, the contact pressure F can thus be adjusted.

By means of the adjustable current intensity, the magnetic field B and thus the contact pressure F of the cleaning element 6 against the housing window 3 can be varied by the magnetic field generator 12.

If the cleaning unit 5 is a round brush, the rotational speed of the round brush can be adjusted by adjusting the current consumption of the drive. In this case, the cleaning unit 5 preferably has a rotational speed sensor (not shown). By adjusting the rotational speed, the housing window 3 can be cleaned depending on the application, that is to say, depending on the existing local conditions of use.

As a result of increasing contact pressure and greater rotational speeds, slightly adhering soiling is gradually removed first, and as the cleaning brush approaches the housing window 3, even more strongly adhering soiling is removed as the pressure increases.

In FIG. 2 and FIG. 3, the magnetic field generator 12 and the magnetic counterpart 13 are arranged in the interior of the sensor housing 2 and are constructed, for example, like a magnetic switch. In this case, the magnetic counterpart 13 is attached to a shaft 14 which carries the cleaning element 6. Thus, it becomes possible to move the shaft 14 and the cleaning element 6 axially along a second axis of rotation R2 using the magnetic module 11 such that the cleaning element 6 is pressed with the contact pressure F against the housing window 3 (see arrow F in FIGS. 2 and 3). The drive 8 is connected to the shaft 14 such that the shaft 14 is suitable to rotate about the second axis of rotation R2 to move the cleaning element 6 across the housing window 3 (see annular arrow about the second axis of rotation R2 of the shaft 14 in FIG. 2).

The sensor 1 further comprises a dirt detection unit 10. The dirt detection unit 10 is suitable for detecting soiling of the housing window 3. The dirt detection unit 10 is connected to the pressing unit 9 and is suitable for controlling the contact pressure F depending on the detected soiling of the housing window 3. The dirt detection unit 10 is, for example, part of the sensor unit 4 or is the sensor unit 4. In the case of an optical sensor, this means, for example, that the radiation reflected on the housing window 3 is used to infer the degree of soiling of the housing window 3. If the housing window 3 is clean, hardly any radiation is reflected from the housing window 3 to the sensor unit 4. If the housing window 3 is dirty, radiation is increasingly reflected from the housing window 3 to the sensor unit 4. The same principle can be applied to the case of an ultrasonic sensor.

By means of the dirt detection unit 10, it is possible to also identify permanent soiling that cannot be removed by the cleaning element 6, for example by comparing a reflection signal from the housing window 3 with a reference reflection signal.

The dirt detection unit 10 enables an automated and intensity-adapted cleaning of the sensor 1, which guarantees the operability and reduces servicing and maintenance costs.

The invention claimed is:

1. A sensor comprising:
   a sensor housing defining an interior and including a housing window;
   a sensor unit disposed in the sensor housing and configured to emit a sensor signal through the housing window and to receive a detection signal through the housing window;
   a cleaning unit including a cleaning element, a shaft and a drive,
   wherein the cleaning element is attached to the shaft such that the cleaning element selectively contacts the housing window from an exterior direction,
   wherein the shaft extends through a wall of the sensor housing, connected to the cleaning element exterior of the sensor housing and to the drive in the housing interior, and wherein the shaft is operable to rotate about an axis of the shaft and to translate within the sensor housing, and
   wherein the drive is connected to the shaft and is configured to cause the shaft to rotate about the axis and the cleaning element to move across the housing window; and
   a pressing unit configured to exert an adjustable contact pressure on the cleaning element such that the cleaning element is pressed against the housing window with the contact pressure,
   wherein the pressing unit comprises a magnetic module disposed within the sensor housing and including a magnetic field generator and a magnetic counterpart, wherein the magnetic field generator is configured to generate an adjustable magnetic field, and wherein either the magnetic field generator or the magnetic counterpart is connected to the translating shaft of the cleaning unit, and moves therewith, such that the contact pressure of the cleaning element is adjustable via the adjustable magnetic field acting on the magnetic counterpart.

2. The sensor of claim 1, further comprising a dirt detection unit configured to detect soiling of the housing window, wherein the dirt detection unit is in communication with the pressing unit as to enable control of the contact pressure dependent upon the detected soiling of the housing window.

3. The sensor of claim 1, wherein the magnetic counterpart is connected to the shaft of the cleaning unit and the magnetic field generator is mounted within the sensor housing in a fixed position.

4. The sensor of claim 1, wherein the magnetic field generator is connected to the shaft of the cleaning unit, and the magnetic counterpart is mounted within the sensor housing in a fixed position.

5. The sensor of claim 1, wherein the cleaning element is a roller configured to rotate about a roller axis, which extends parallel to the housing window.

6. The sensor of claim 1, wherein the cleaning element is a round brush and is configured to be rotatably driven by the shaft.

7. The sensor of claim 1, wherein the cleaning element is a wiper.

* * * * *